F. W. HIGHFIELD.
THE REDUCTION OF METALLIC OXIDS AND THE LIKE.
APPLICATION FILED MAR. 15, 1915.
1,153,786.
Patented Sept. 14, 1915.
2 SHEETS—SHEET 2.
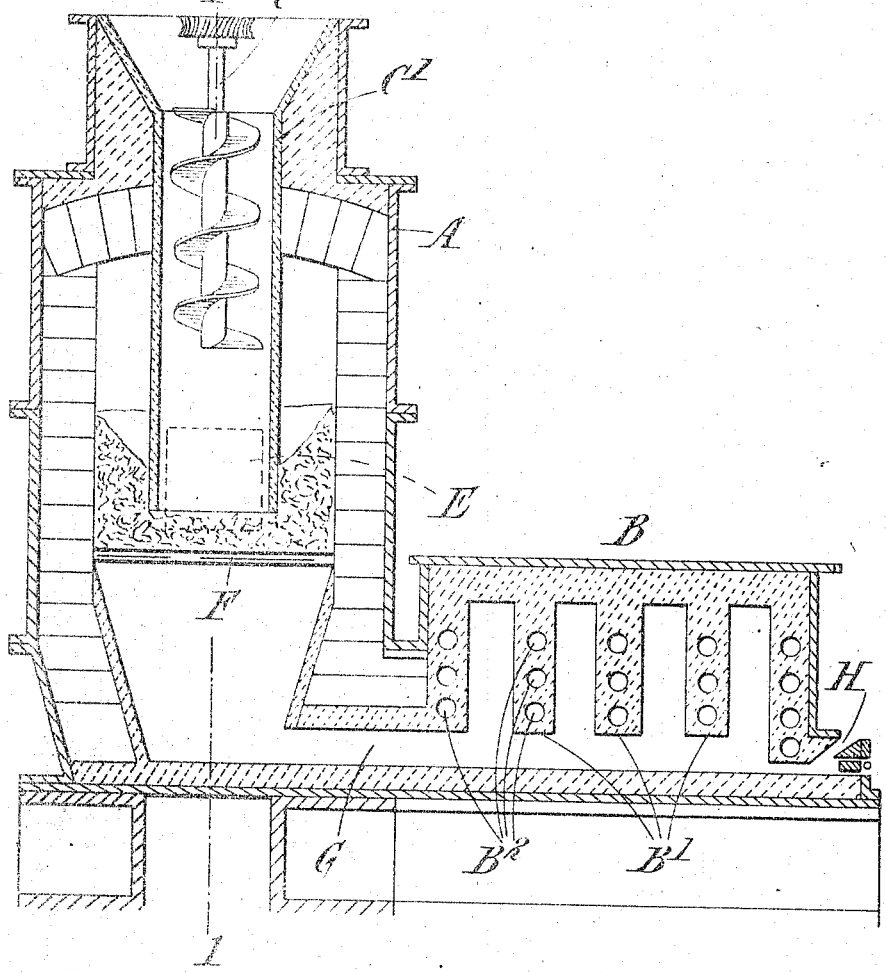

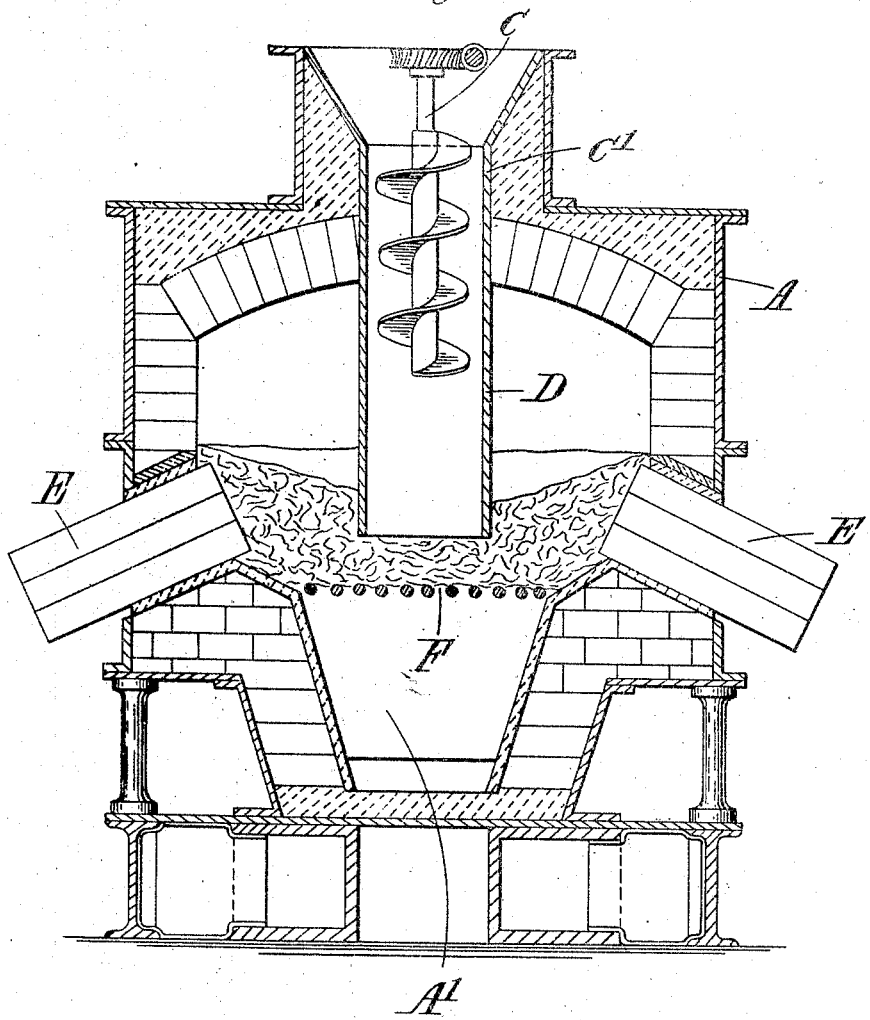

UNITED STATES PATENT OFFICE.

FRANK WILLIAM HIGHFIELD, OF CAVERSHAM, ENGLAND.

REDUCTION OF METALLIC OXIDS AND THE LIKE.

1,153,786.  Specification of Letters Patent.  Patented Sept. 14, 1915.

Application filed March 15, 1915. Serial No. 14,453.

*To all whom it may concern:*

Be it known that I, FRANK WILLIAM HIGHFIELD, a subject of the King of England, residing at Caversham, Oxford, England, have invented certain new and useful Improvements in the Reduction of Metallic Oxids and the like, of which the following is a specification.

This invention relates to the reduction of metallic oxids and the like, and in particular to a process and apparatus for the reduction of zinc oxid and the like by electrical means.

The process and apparatus have been invented primarily for the reduction of zinc oxid, but those skilled in the art will find other applications therefor, for example in the reduction of litharge.

It has heretofore been proposed to treat zinc salts or zinc ores in an electrically heated furnace with a view to the recovery of pure metallic zinc but in such operations the impurities and dust give rise to difficulties which greatly militate against the efficiency and success of the processes proposed.

The process according to the present invention does not propose to treat material other than zinc oxid or blue powder, for by starting the true reducing process with this material a serious factor of difficulty is eliminated.

Another factor that gives rise to difficulty and has prevented success in some methods heretofore proposed, in the reduction of zinc oxid, is the extremely low vapor pressure of the metal, which low vapor pressure necessitates the employment of as large a condensation surface as possible so as to promote the collection and conglomeration of condensed metallic globules. Other factors which have to be carefully provided for are (*a*) that the temperature must be very closely under control since otherwise the reaction will not be completed, (*b*) the zinc vapor must be in very intimate contact with the hot carbon in order that the reaction may proceed rapidly, (*c*) the atmosphere where the reaction is carried on, that is to say in the region of contact with the hot carbon, must be an atmosphere of pure carbon monoxid; if it is impure there is a loss of metal, but, what is probably more important, is that the prominent impurity will be carbon dioxid. This is heavier than the monoxid and therefore displaces the latter gas, driving it upward. Upward displacement of the monoxid means that the reducing zone of the furnace has moved upward and this is objectionable for obvious reasons.

If the heat of the carbon is maintained mainly or exclusively from ordinary combustion thereof by the admission of air or oxygen, the temperature developed at the surface of the carbon is usually too high for efficient operation of the furnace since it is so high as to very largely prevent the condensation of the zinc vapor.

According to the present invention, therefore, I provide a process for the recovery of zinc from its oxid or from blue powder whereby the oxid or powder is fed on to the glowing surface of a bed of electrically heated carbon in an atmosphere of substantially pure carbon monoxid and the thereby reduced and condensed metal is allowed to percolate by gravity through the said bed of carbon and is collected beneath the said carbon; after having been collected and before it is passed to the open air the metal is preliminarily cooled in a neutral or a reducing atmosphere.

The process is, according to this invention preferably carried out in a furnace provided with a septum that is heated by the furnace, is porous to carbon monoxid at the working temperature of the furnace and that divides the metallic oxid from an atmosphere of carbon monoxid derived from the said electrically heated carbon. The septum conveniently takes the form of the wall of a tube employed to direct the oxid on to the bed of carbon.

A form of furnace constructed according to this invention for the reduction of zinc oxid is illustrated in the accompanying drawings, in which:—

Figure 1 is a transverse vertical section through the furnace on the line 1—1 of Fig. 2; and Fig. 2 is a vertical longitudinal central section through the furnace.

The furnace proper is seen at A and is provided with an extension B to form a cooling chamber for the metal. A conical feed hopper C is provided at the top of the furnace and delivers the oxid to a conduit or pipe D formed of fireclay so that its wall may be porous to CO. This conduit is hereinafter called the condensation tube.

Within the upper end of the tube D there is a feed screw $C^1$ by which the oxid is fed down into the furnace from the hopper.

The furnace chamber A is oblong in plan, and in its two short side walls are electrodes E of carbon which pass right through the walls. Below the open bottom of the tube D, is a grate F whose bars are of fireclay; they may, however, be of iron if desired.

The furnace chamber terminates at its lower end in a portion $A^1$ that is formed as an inverted pyramid that constitutes what may be termed the hearth of the furnace.

From below the hearth, a conduit G communicates with the cooling chamber B. This is traversed by a number of partitions or ribs $B^1$ and these, as well as the end walls of this chamber are pierced with pipes $B^2$ for the circulation of air or other cooling medium.

The outlet for molten metal is by the siphon trap H.

In use, coke or charcoal is piled upon the fire-bars in a somewhat pyramidal heap with a sufficiently extended base to make a contact with both the electrodes. Current is then turned on to the electrodes, and the heap of carbon thus brought to a glowing condition by the heat generated in it by the current. The carbon forms at the moment of first starting the furnace a certain small proportion of $CO_2$ but in the main forms CO. The zinc oxid is then fed into the hopper, and allowed to enter the furnace by the operation of the screw conveyer at the base of the hopper.

The coke is so disposed as to cause the hottest part of the furnace to be at the walls of the tube D. The temperature should be in the neighborhood of 1050° C. but should not greatly exceed this value. The reactions probably are as follows:—

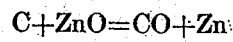

at the temperature employed:—then probably, (and probably in greater importance).

whereupon the $CO_2$ is itself reduced to CO.

The walls of the tube D are porous to CO, and this fact, coupled with the porous character of the coke, serves to provide a large surface for condensation, in relation to the volume of the furnace. The large surface referred to is constituted in part by that of the coke and in part by that of the interstices of the tube wall. Owing to the extremely small vapor pressure of zinc oxid this large condensation surface is peculiarly advantageous where zinc is being recovered. Further, since the hottest part of the furnace is at the tube D, any $CO_2$ formed is immediately reformed into CO, so that the working atmosphere is CO and, moreover, the vapor pressure is made to be greatest in the tube so that rapid condensation is promoted.

It is to be remarked that although the term "condensation" is herein employed the term is employed in default of a better, to describe the combined actions of condensation, and of running together of condensed globules or possibly of these actions inseparable from and therefore combined with that of reduction. I have found that this combined action takes place under the conditions herein set forth, with greater completeness and with more readiness than under other heretofore employed conditions. It does not appear to depend in the ordinarily accepted and simple manner merely upon temperature nor merely upon the joint effects of temperature and pressure.

A very small quantity of blue powder is likely to be formed at the start, but when the furnace has been in operation for a short time all $CO_2$ will have been reduced, and the condition essential for the reduction without the formation of blue powder, namely glowing carbon in an atmosphere of pure CO, will have been reached.

The reduced metal in a liquid condition percolates through the glowing carbon past the fire-bars, and is collected in the hearth beneath. From here it passes to the cooling chamber, the provision of which is desirable with zinc, in order to prevent the metal reaching the open air at a temperature so high as to cause a ready oxidation. The cooling chamber is completely closed except for the inlet and outlet for metal, and may conveniently be filled with nitrogen or other inert gas when starting. If this be not done, and the chamber be full of air, the metal will be oxidized by the oxygen present, until this be exhausted, but the said use of nitrogen in the chamber at the start will prevent the formation even of this small quantity of oxid.

Doors are provided in the usual manner for cleaning the furnace and for feeding in coke as required, but such doors are not shown in the drawings.

What I claim as my invention and desire to secure by Letters Patent is:—

1. In a furnace for the recovery of zinc from an oxidized condition thereof, the combination of a wall of material that is porous to carbon monoxid at the working temperature of the furnace and that divides the said zinc in its oxidized condition from the atmosphere of the furnace, electrically heated carbon adjacent to the said wall to heat it and to provide a furnace atmosphere of carbon monoxid, a grate beneath the carbon to support it, a chamber beneath the grate to receive the reduced metal and a cooling chamber in direct communication with the said receiving chamber.

2. In a furnace for the recovery of zinc from zinc oxid, the combination of a feed tube whose wall is porous to carbon monoxid at the working temperature of the furnace and which is supported to be immersed in an atmosphere of pure carbon monoxid and to have its delivery end in contact with the upper surface of a body of porous carbon, means to heat the said body electrically, a grate within the furnace upon which the body of carbon is supported, a chamber beneath the grate to receive the reduced metal and a cooling chamber in direct communication with the said receiving chamber, but sealed from the open air.

3. In a furnace for the recovery of zinc from an oxidized condition thereof, the combination of a feed tube whose wall is porous to carbon monoxid at the working temperature of the furnace and which is supported to have its delivery end in contact with electrically heated carbon upon a grate within the furnace, means within the feed tube to propel the material therethrough, a chamber beneath the grate to receive the reduced metal and a cooling chamber in direct communication with the said receiving chamber.

4. In a furnace for the recovery of zinc from an oxidized condition thereof, the combination of porous material supported in the hottest part of the furnace, a grate within the furnace beneath the said porous material, means to heat electrically the said material above the grate, means to feed zinc in an oxidized condition on to the said material above the grate, a chamber beneath the grate to receive the reduced metal, a cooling chamber in direct communication with the said receiving chamber and having downwardly depending projections from its roof pierced by conduits for the circulation of a cooling medium and provided with a liquid seal at the outlet for metal.

In testimony whereof I have signed my name to this specification in the presence of two subscribing witnesses.

FRANK WILLIAM HIGHFIELD.

Witnesses:
HAROLD H. SIMMONS,
HARRY B. SLEDGE.